United States Patent
Jacobs et al.

(10) Patent No.: US 12,224,417 B1
(45) Date of Patent: Feb. 11, 2025

(54) INTERCELLULAR SUPPORT STRUCTURE OF A BATTERY SYSTEM

(71) Applicant: Rivian IP Holdings, LLC, Irvine, CA (US)

(72) Inventors: Tyler Jacobs, Hawthorne, CA (US); Jonathan Christopher Wilson, Rancho Mission Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/438,814

(22) Filed: Feb. 12, 2024

(51) Int. Cl.
| | |
|---|---|
| *H01M 10/6557* | (2014.01) |
| *H01M 10/613* | (2014.01) |
| *H01M 10/625* | (2014.01) |
| *H01M 10/643* | (2014.01) |
| *H01M 50/204* | (2021.01) |
| *H01M 50/213* | (2021.01) |
| *H01M 50/227* | (2021.01) |
| *H01M 50/293* | (2021.01) |

(52) U.S. Cl.
CPC ..... *H01M 10/6557* (2015.04); *H01M 10/613* (2015.04); *H01M 10/625* (2015.04); *H01M 10/643* (2015.04); *H01M 50/204* (2021.01); *H01M 50/213* (2021.01); *H01M 50/227* (2021.01); *H01M 50/293* (2021.01); *H01M 2220/20* (2013.01)

(58) Field of Classification Search
CPC ............. H01M 10/613; H01M 10/625; H01M 10/643; H01M 10/6557; H01M 50/204; H01M 50/213
See application file for complete search history.

(56) References Cited

U.S. PATENT DOCUMENTS

| | | | |
|---|---|---|---|
| 2019/0296407 A1* | 9/2019 | Newman | H01M 10/6555 |
| 2021/0399355 A1* | 12/2021 | Darlix | H01M 10/4257 |
| 2022/0203645 A1 | 6/2022 | Jacobs | |
| 2023/0111495 A1* | 4/2023 | Jung | H01M 50/293 |
| | | | 429/120 |
| 2023/0335853 A1* | 10/2023 | Davis | H01M 50/264 |

* cited by examiner

*Primary Examiner* — Jonathan G Jelsma
(74) *Attorney, Agent, or Firm* — Foley & Lardner LLP

(57) ABSTRACT

An intercellular support structure of a battery system is provided. The battery system includes cells arranged in an array and a first support structure with a first material to hold a first portion of a first group of cells with a first spacing between the first group of cells. The battery system includes a second support structure, adjacent to the first support structure, which can include a second material to hold, and can provide a second spacing between, a second portion of the first group of cells and a first portion of a second group of cells. The battery system can include a third support structure, adjacent to the second support structure and opposite to the first support structure, which can include the first material to hold a second portion of the second group of cells with the first spacing between the second portion of the second group of cells.

21 Claims, 14 Drawing Sheets

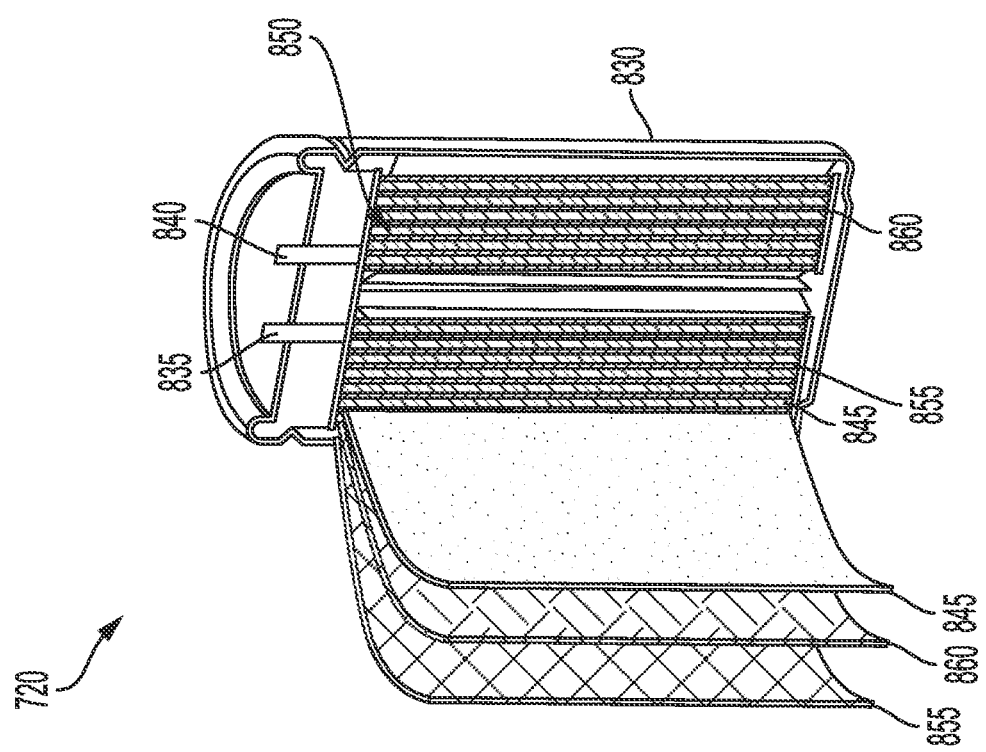

INTERCELLULAR SUPPORT STRUCTURE OF A BATTERY SYSTEM

INTRODUCTION

Electric vehicles (EVs) can be powered using batteries that store energy to reduce greenhouse gas emissions. The batteries can include different components facilitating energy storage.

SUMMARY

This disclosure is generally directed to an intercellular support structure of a battery system. An EV can be powered from a battery system having any combination of battery packs, battery modules or battery cells. A battery system can include a plurality of cells arranged in an array. The battery system can include an intercellular structure. The intercellular structure can be used to hold or support a group of cells within the battery system. The intercellular structure can improve the assembly and thermal management of the battery system. The intercellular structure can allow for non-continuous configurations such as cooling tubes or insulating structures that are around cells or arrays. The intercellular structure can streamline the assembly process, minimize costs, and improve thermal and structural efficiency. The intercellular structure can be referred to as support structure.

At least one aspect is directed to a battery system. The battery system can include a group of cells arranged in an array. The battery system can include at least one support structure that can hold a group of cells. The battery system can include three support structures that can hold multiple groups of cells. A first support structure can include a first material to hold a first portion of a first group of cells. The first support structure can include a first spacing between the first group of cells. A second support structure, adjacent to the first support structure, can include a second material to hold a second portion of the first group of cells and a first portion of a second group of cells. The second support structure can include a second spacing between the second portion of the first group of cells and the first portion of the second group of cells. A third support structure, adjacent to the second support structure and opposite to the first support structure, can include the first material to hold a second portion of the second group of cells. The third support structure can include the first spacing between the second portion of the second group of cells.

At least one aspect is directed to a method. The method can include providing a battery system comprising a plurality of cells arranged in an array and at least one support structure. The method can include providing a battery system comprising a plurality of cells arranged in an array and three support structures. A first support structure can include a first material to hold a first portion of a first group of cells. The first support structure can include a first spacing between the first group of cells. A second support structure, adjacent to the first support structure, can include a second material to hold a second portion of the first group of cells and a first portion of a second group of cells. The second support structure can include a second spacing between the second portion of the first group of cells and the first portion of the second group of cells. A third support structure, adjacent to the second support structure and opposite to the first support structure, can include the first material to hold a second portion of the second group of cells. The third support structure can include the first spacing between the second portion of the second group of cells.

At least one aspect is directed to an electric vehicle. The electric vehicle can include a battery system comprising a plurality of cells arranged in an array and at least one support structure. The electric vehicle can include a battery system comprising a plurality of cells arranged in an array and three support structures. A first support structure can include a first material to hold a first portion of a first group of cells. The first support structure can include a first spacing between the first group of cells. A second support structure, adjacent to the first support structure, can include a second material to hold a second portion of the first group of cells and a first portion of a second group of cells. The second support structure can include a second spacing between the second portion of the first group of cells and the first portion of the second group of cells. A third support structure, adjacent to the second support structure and opposite to the first support structure, can include the first material to hold a second portion of the second group of cells. The third support structure can include the first spacing between the second portion of the second group of cells.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 8C depicts a cross sectional view of a battery cell.

DETAILED DESCRIPTION

Following below are more detailed descriptions of various concepts related to, and implementations of, methods, apparatuses, and systems of an intercellular structure. The various concepts introduced above and discussed in greater detail below may be implemented in any of numerous ways.

This disclosure is generally directed to a solution for providing efficient integration of an intercellular structure with a battery system of an EV. The battery system can be called a battery assembly. The battery system can include an assembly of a battery pack, or a battery module. An EV can store energy in a battery system that can include interconnected battery pack or battery modules. The battery system can include a group of cells arranged in an array. The battery system can include at least one support structure that can hold a group of cells. The battery system can include three support structures that can hold multiple groups of cells. However, integrating the intercellular structure into a battery system can be difficult. For example, two-part liquid dispense potting can be expensive, utilize sophisticated machinery, use additional materials, introduce greater mass into the battery system, be process intensive, and time intensive.

The present solution can provide efficient integration of an intercellular structure in a battery system of an EV. The present solution can utilize modular sequences and assemblies to create a support structure for a battery system of an EV. The resulting solution can allow for non-continuous support structure configurations. The support structure can include foam. The foam can have lower gravimetric density than material used in, two-part liquid dispense potting. The resulting solution can increase the gravimetric energy density of the battery. The support structure can increase thermal propagation resistance. The support structure can provide structural adherence. The support structure can unify the cells within each structure into one cohesive structure.

Figure 1A:
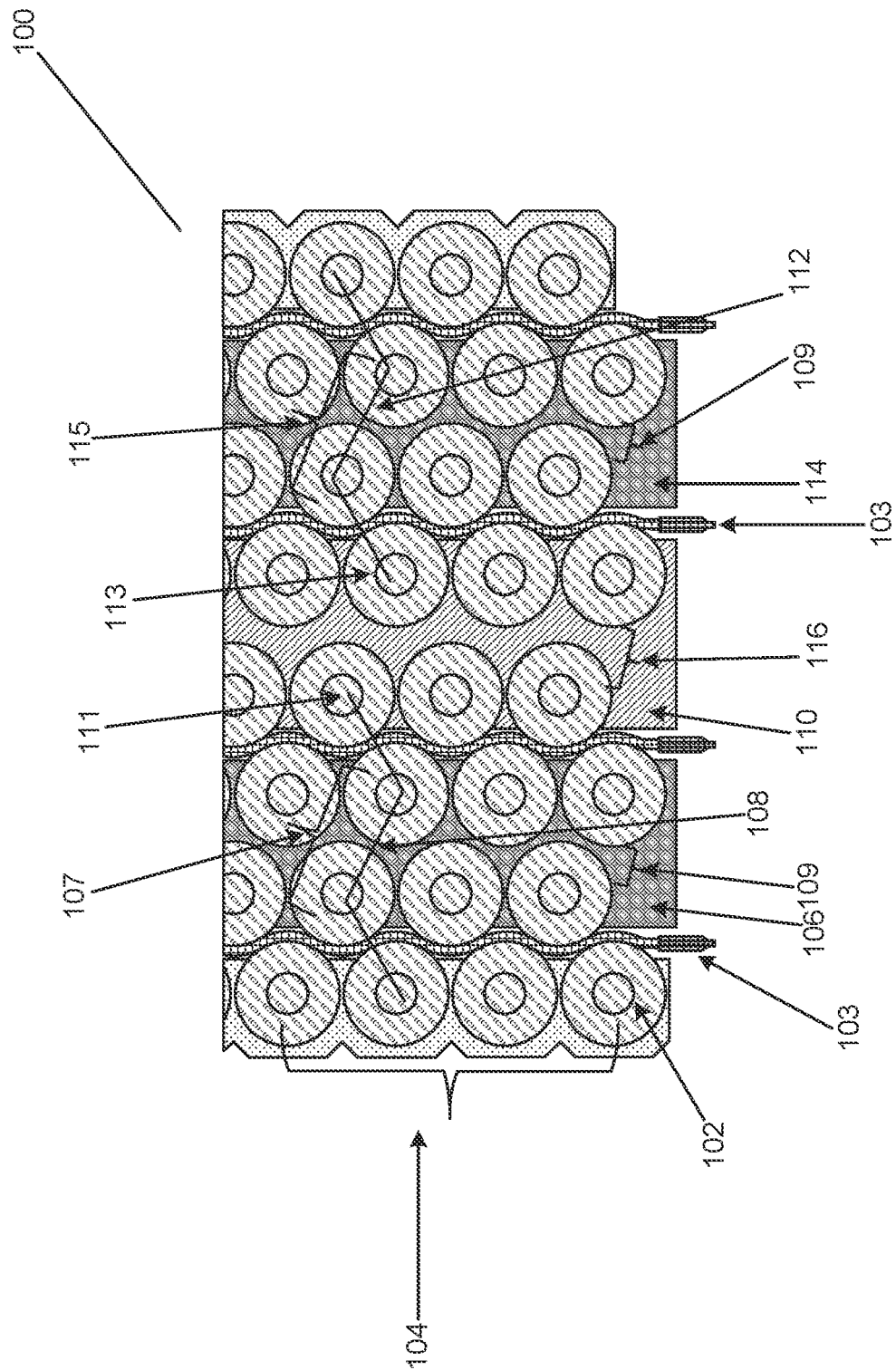
FIG. 1A depicts an example of a battery system with a support structure to hold a group of cells.

FIG. 1A depicts an example of a battery system 100 with a support structure to hold a group of cells. The battery system 100 can include multiple cells 102 arranged in an array 104. The cells 102 can be pouch, prismatic, 18650, 21700, or 26650. The cells 102 can be a combination of, but not limited to, pouch, prismatic, 18650, 21700, or 26650. The multiple cells 102 can be a part of a parallel group (such as parallel group configurations) 108. The parallel group configurations can increase the total capacity of the battery system. The parallel group configurations can spread the current load across multiple cells. The multiple cells 102 can be part of a group of cells.

The battery system 100 can include at least one support structure that can hold a group of cells. For example, the battery system 100 can include one support structure that holds one group of cells, two support structures that hold two groups of cells, three support structures that hold three groups of cells, or more. In some cases, a group of cells can be held by two different support structures. For example, a first support structure 106 can hold a first portion 107 of a first group of cells 108, and a second support structure 110 can hold a second portion 111 of the first group of cells 108.

The different support structures can hold the cells with different spacings. The support structures can be configured to provide different cell spacings on the characteristics of the cells or the electrical relation between different groups of cells. For example, if two groups of cells are intended to operate at high currents (or high voltage) simultaneously, the two groups of cells can have a larger cell spacings, compared to low current (or low voltage) operations, to allow for better thermal management. If one group of cells is intended for low-currents operations and the other group of cells is intended for high-currents operations, the two groups of cells can be spaced closer together to save space. The different spacings can allow for the different distribution of mechanical stresses across the battery system. The different spacings can ensure that cells are not subject to undue pressure that can compromise the cells structural integrity or functionality.

Varying the cell spacings can offer flexibility in designing custom battery layouts tailored to specific power and energy needs. For example, an urban EV can prioritize rapid charging over long-range, and can necessitate a different cell arrangement compared to a long-haul EV.

The first support structure 106 can include a first spacing 109 between the first group of cells. The first portion 107 of the first group of cells 108 can include two cells. The first spacing 109 between the first portion 107 of the first group of cells 108 can be the distance between the cells. A second support structure 110, adjacent to the first support structure 106, can hold a second portion 111 of the first group of cells 108 and a first portion 113 of a second group of cells 112. The second support structure 110 can include a second spacing 116 between the second portion 111 of the first group of cells 108 and the first portion 113 of the second group of cells 112. A third support structure 114, adjacent to the second support structure 110 and opposite to the first support structure 106, can hold a second portion 115 of the second group of cells 112. The third support structure 114 can include the first spacing 109 between the second portion 115 of the second group of cells 112. The first support structure 106 can include a first material. The second support structure 110 can include a second material. The third support structure 114 can include the first material.

The material can be chosen based on the material properties such as thermal insulation or conductivity, structural strength, gravimetric density, ability to disperse heat, ability to resist combustion, or chemical resistance. For example, the material can be or include foam. Each of the support structures can include the same material or different materials. Each of the support structures can include foam of the same type and characteristics, or the different foam materials in the different support structures can be configured to have different properties (e.g., electrical or thermal properties). The foam can include, but is not limited to, polyurethane foam, silicone foam, melamine foam, aerogel-based foam, polyethylene foam, polystyrene foam, viscoelastic foam, ethylene-vinyl acetate foam, or phenolic foam. At least one of the first material or the second material can include expanded polypropylene. At least one of the first material or the second material can include modified polyphenylene ether. The material can provide thermal management for the cells 102 in the battery system 100. The material can control or regulate the temperature of the cells 102 in the battery system 100. The material can insulate, dissipate, or redirect heat in the battery system 100. Thermal management can prevent overheating, thermal degradation, or thermal runaway. Thermal management can increase safety.

The first support structure 106 can include a thermal component 103 within the material to carry a fluid to dissipate heat generated from the first portion 107 of the first group of cells 108. The thermal component 103 can be an insulating structure such as a fin, barrier, tube, insulation layer, or composite layer. The insulating structure can used for or enhance thermal management or insulation, physical separation, or protection, etc. A first block can be formed from the first support structure 106 and the first portion 107 of the first group of cells 108. The number, count or quantity of cells 102 in the first block can be larger than 4, 5, 6, 7, 8, 10, 15, 20, 25, 30, 50, 100, 500, or 1000, or more, for example. The length of the first block can be larger than 50 mm. The length of the first block can be 50 mm, 100 mm, 500 mm, 1000 mm, 2000 mm, or 20000 mm. The thermal component 103 can be attached or positioned to a side of the cells.

A second block can be formed from the second support structure 110 and the second portion 111 of the first group of cells 108. The second block can be assembled with the first block to establish the array of the plurality of cells. The first spacing 109 can be 0.5 mm, 1.5 mm, 3 mm, 6 mm, 9 mm, 12 mm, 18 mm, 20 mm, 30 mm, or more, for example. The second spacing 116 can be greater than the first spacing 109.

Figure 1B:
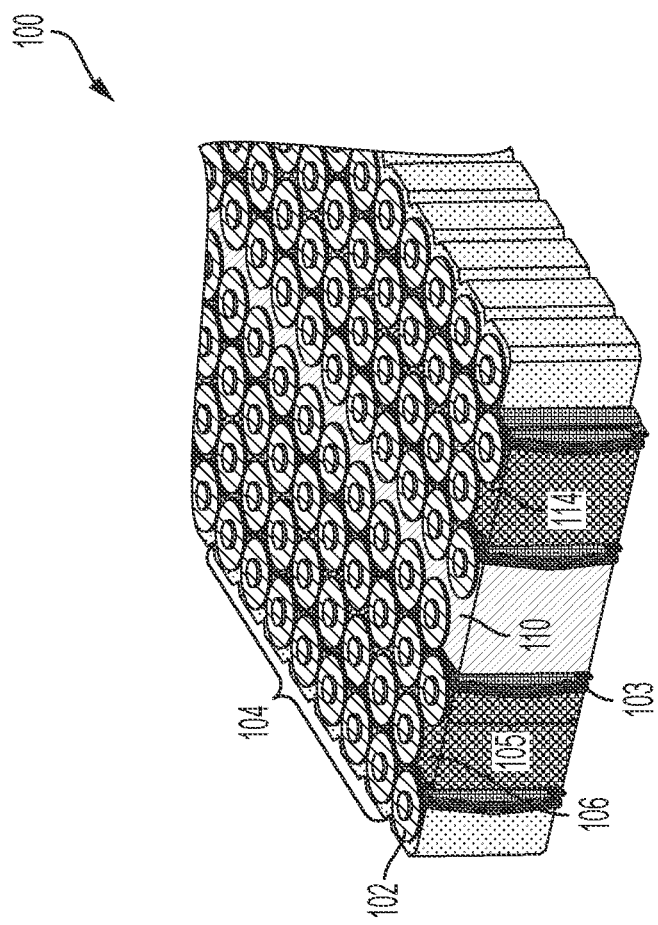
FIG. 1B depicts a three-dimensional representation of an example of a battery system a support structure to hold a group of cells.

FIG. 1B depicts example battery system 100 with a support structure to hold a group of cells. FIG. 1B can include one or more component or functionality depicted in FIG. 1A. The first support structure 106 can have a thickness 105 of at least 2 mm. A greater thickness can allow for better thermal insulation and can reduce the likelihood of heat spreading rapidly from one cell group to another. A greater thickness can increase the physical protection to the cells against external impacts or pressures. The first support structure 106 can have a thickness 105 of 2 mm, 4 mm, 5 mm, 6 mm, 7 mm, 8 mm, 10 mm, 15 mm, 20 mm, 25 mm, 30 mm, 50 mm, 100 mm, 500 mm, or 1000 mm. The second material of the second support structure 110 can be in contact with one or more cells of the first group of cells 108. The second material of the second support structure 110 can be in contact with one or more cells of the second group of cells 112.

Figure 2:
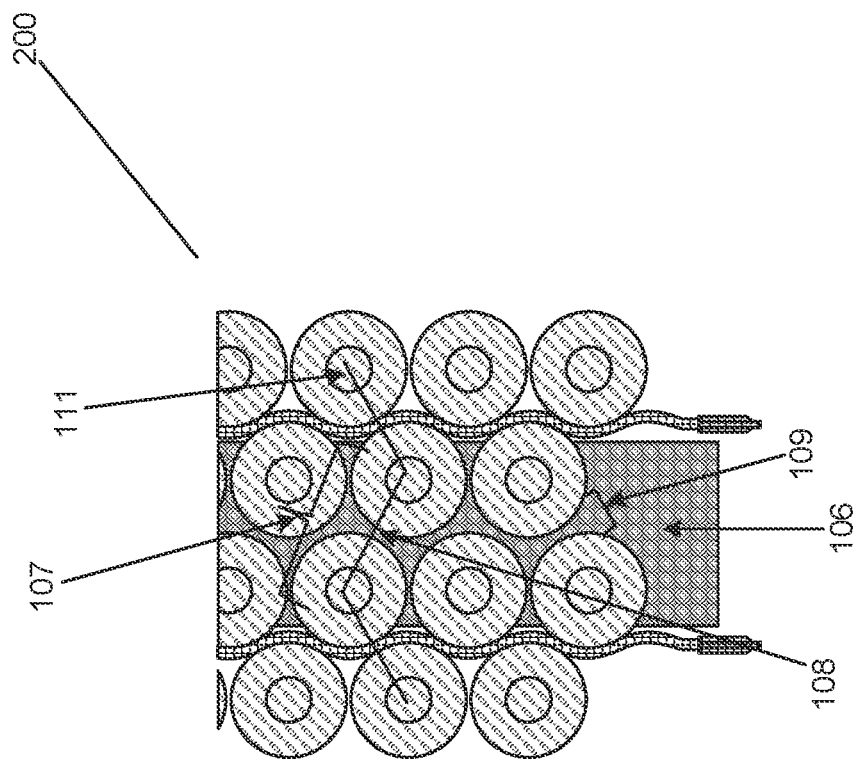
FIG. 2 depicts an example of a battery system with a support structure to hold a group of cells.

FIG. 2 depicts an example of a battery system 200 with a support structure to hold a group of cells. FIG. 2 can include one or more component or functionality depicted in FIG. 1A. The first support structure 106 can hold a first portion 107 of a first group of cells 108. The first support structure 106 can include a first spacing 109 between the first group of cells. The first portion 107 of the first group of cells 108 can include two cells.

Figure 3:
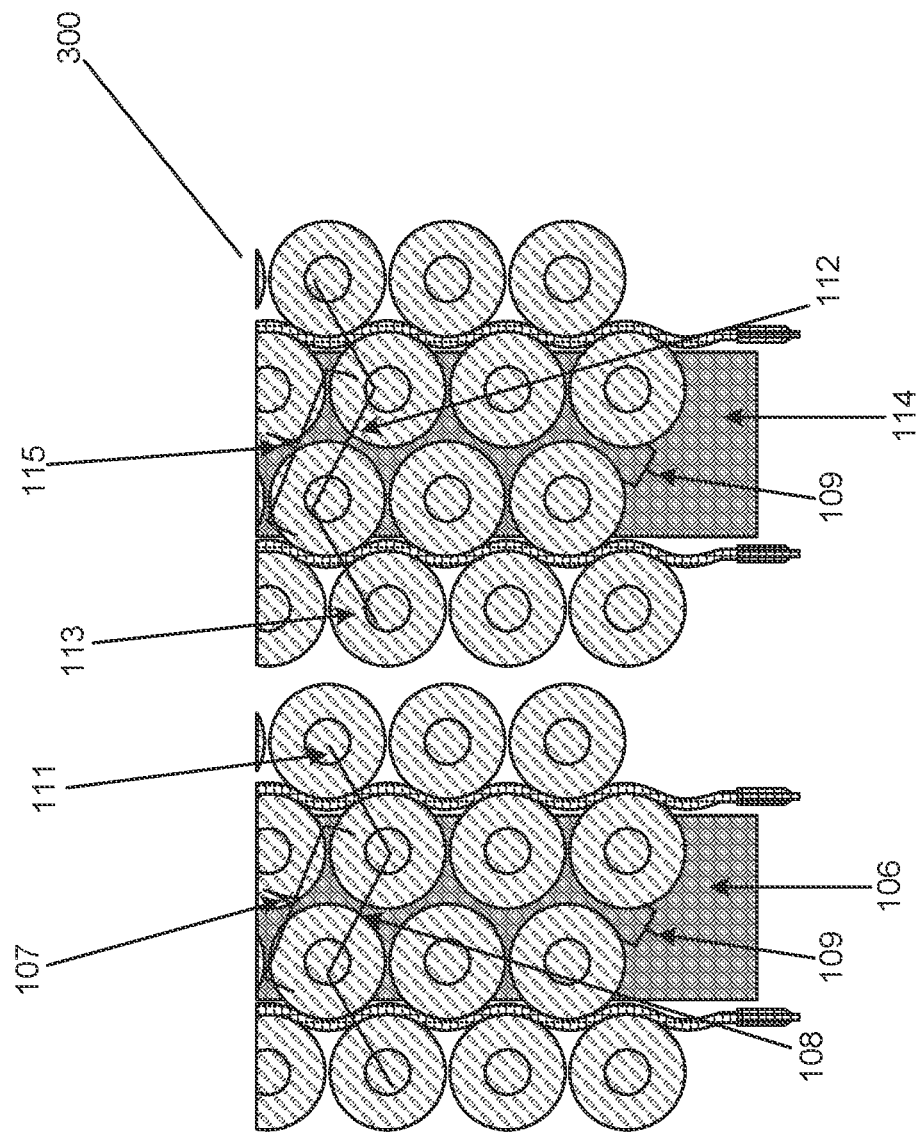
FIG. 3 depicts an example of a battery system with a support structure to hold a group of cells.

FIG. 3 depicts an example of a battery system 300 with a support structure to hold a group of cells. FIG. 3 can include one or more component or functionality depicted in FIG. 2. The third support structure 114 can hold a second portion 115 of the second group of cells 112. The third support structure 114 can include the first spacing 109 between the second portion 115 of the second group of cells 112.

Figure 4:
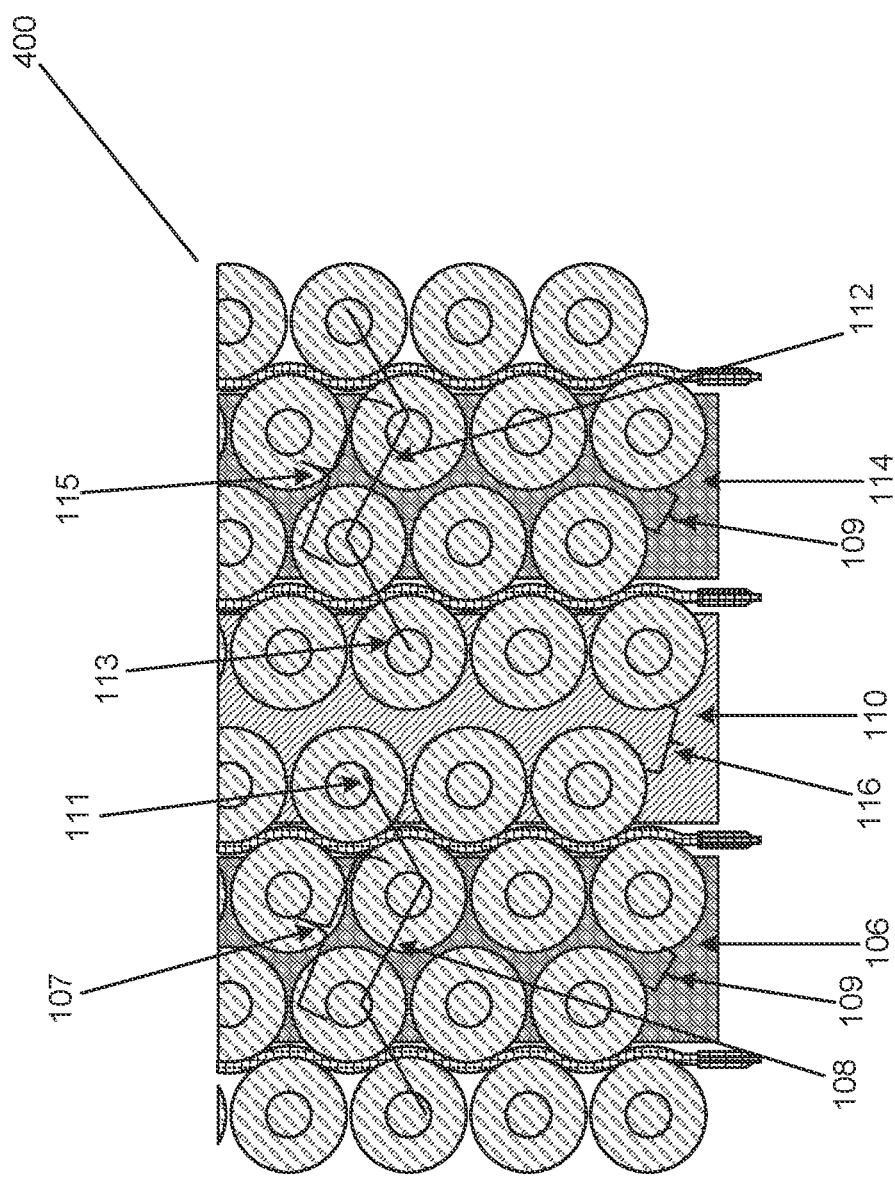
FIG. 4 depicts an example of a battery system with a support structure to hold a group of cells.

FIG. 4 depicts an example of a battery system 400 with a support structure to hold a group of cells. FIG. 4 can include one or more component or functionality depicted in FIG. 3. The second support structure 110 can include a second spacing 116 between the second portion 111 of the first group of cells 108 and the first portion 113 of the second group of cells 112. The support structures can be integrated into modular units. The support structures can be block-like units. The modular units or block-like units can be put together to form the battery system. The support structures can be designed with specific spacings, thicknesses, or materials. The support structures can be designed to accommodate cooling tubes, thermal management components, sensors, or advanced structures.

Figure 5:
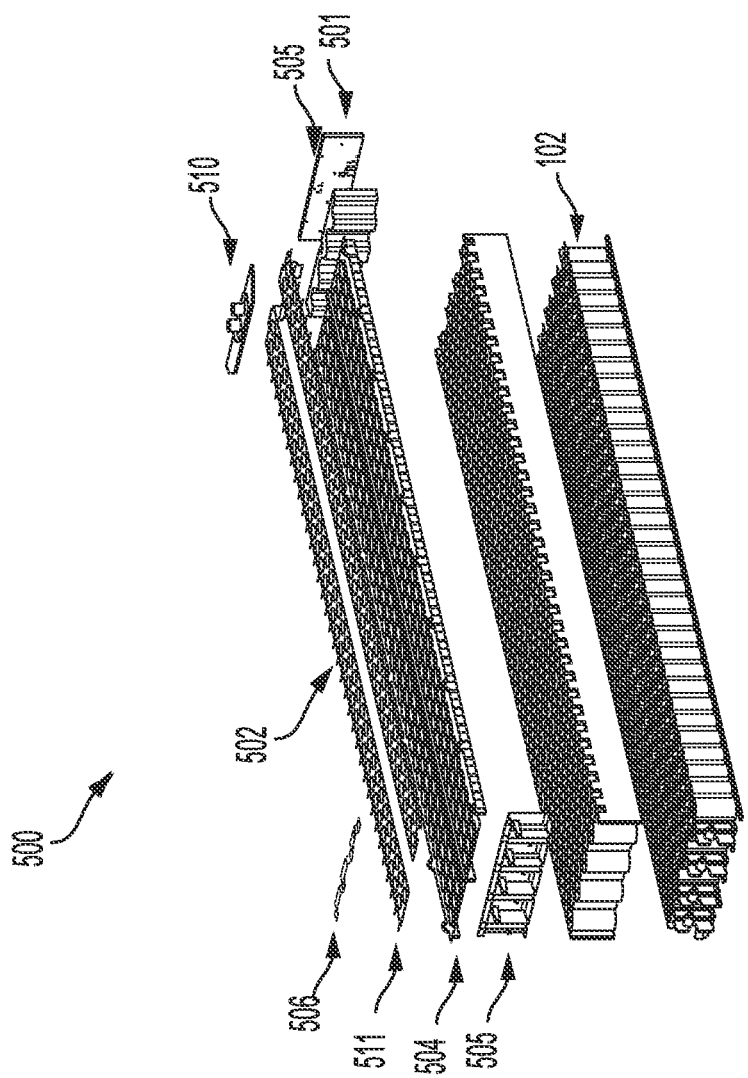
FIG. 5 depicts an example of a battery system with a harness, current collector assembly, and a balancing voltage and temperature module.

FIG. 5 depicts an example of a battery system 500 with a harness, current collector assembly, and a balancing voltage and temperature (BVT) module. The BVT module 501 can include an assembly of various electrical components to monitor or control components of a battery system. The BVT module 501 can include a circuit board having various connectors to couple with, for example, a thermistor that can measure a temperature of the battery subassembly, battery module or a battery cell thereof, a voltage sensor or balancer that can sense or control voltage that flows through the battery subassembly, battery module or a battery cell thereof, or a communication device that can receive, transmit, or analyze data associated with the battery subassembly, battery module or a battery cell thereof.

The current collector assembly 502 can include a conductor layer 504. The conductor layer 504 can include a material to conduct electricity (e.g., gold, copper, aluminum, silver, or a combination of metallic metals). The materials of the conductor layer 504 can be designed, constructed, or selected to conduct electricity. For example, the materials of the conductor layer 504 can have a sufficient density of free electrons to allow for the transmission of electric current to provide power to one or more component of an electric vehicle, such as an electric motor or on-board computer system. The conductor can be formed by depositing the material onto a substrate following a process including at least one of physical vapor deposition, chemical vapor deposition, electroplating, chemical deposition, among others. The conductor layer 504 can provide an electrically conductive path for electricity to and from battery cells that can be housed within a battery module. Instead of injecting the conductor layer 504 into the insulative structure, the conductor layer 504 can be partially removed from the insulative structure. For example, the conductor layer 504 can be coupled to the insulative structure using an adhesive. In some arrangements, the adhesive can be removed to separate the conductor layer 504 and the insulative structure.

The conductor layer 504 can include a plurality of polygons or quadrilaterals (e.g., square, rhombus, parallelogram, etc.) to form spaces for the battery cells. For example, the spaces for the battery cells can be a plurality of squares. In another example, the spaces of the battery cells can be a plurality of rhombi. The plurality of polygons or quadrilaterals can include a symmetrical or asymmetrical arrangement. For example, one space can be offset by 3 centimeters and at a 45-degree angle from the space adjacent to it. In some arranges each space can be aligned along first axis.

The current collector assembly 502 can include a series busbar 506. The series busbar 506 can include a metallic material but is not limited to copper and aluminum. The metallic material may depend on the characteristics of the current collector assembly 502. For example, a series busbar 506 can have an aluminum material to reduce the weight of the current collector assembly. In some arrangements, copper can be used due to the higher conductivity. In some arrangements, copper can be used to increase the longevity of the series busbar 506. In some arrangements, the series busbar 115 can have a structure proportional to the height of the rib 115. For example, if the rib 115 is 3.2 cm, the series busbar 506 can have a displace from the rib 115 of 4.2 cm.

The series busbar 506 can maintain electrical current distribution in the current collector assembly 502. The desired voltage can be established by the harness 511. The series busbar 506 can be a centralized ground for the current collector assembly 502. The metallic material of the series busbar 506 can provide a low-impedance path for the current to flow to ground. For example, the series busbar 506 can direct the current. In some arrangements, the series busbar 506 can protect the components of the current collector assembly 502. For example, the series busbar 506 can reduce the possibility of an occurrence of fault currents in the current collector assembly 502.

The short wall 505 can be used to protect the components of the current collector assembly 502. For example, the short wall 505 can protect the harness 511, one or more terminals, and the battery cells 102. A treehouse busbar 510 can include materials, structure, and functionality similar to the series busbar 506.

The BVT module 501 can access the state of charge of the battery cells 102 and further determine whether the battery cells 102 have sufficient voltage to operate the current collector assembly 502. For example, an interface can be couple to the BVT module 501 to display the state of charge of the battery cells 102. The BVT module 50 and the harness 511 can work together to provide accurate voltage measurements of the battery cells 102 of a current collector assembly. For example, the harness 511 can continuously monitor the voltage of each battery cell 102 in the battery cells 102. The real-time feedback can be transmitted to the BVT module 501 to provide the interface with a continuously updated measurement of the voltage of each battery cell 102 in the battery cells 102. The combination of the harness 511 and the BVT module 501 can provide convenience of on-the-spot voltage checks and the benefits of automated, continuous monitoring to ensure optimal performance and prevent potential issues.

Figure 6:
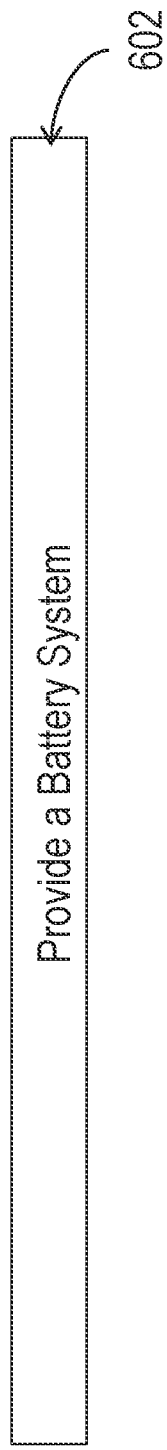
FIG. 6 is a flow diagram illustrating an example method of providing a battery system.

FIG. 6 depicts a method 600 for providing a battery system. The method 600 can include providing the battery system at ACT 602. The battery system can include that can include a plurality of cells arranged in an array and at least one support structure. The method can include providing a battery system include a plurality of cells arranged in an array and three support structures. A first support structure can include a first material to hold a first portion of a first group of cells. The first support structure can include a first spacing between the first group of cells. A second support structure, adjacent to the first support structure, can include a second material to hold a second portion of the first group of cells and a first portion of a second group of cells. The second support structure can include a second spacing between the second portion of the first group of cells and the first portion of the second group of cells. A third support structure, adjacent to the second support structure and opposite to the first support structure, can include the first material to hold a second portion of the second group of cells. The third support structure can include the first spacing between the second portion of the second group of cells.

Figure 7:
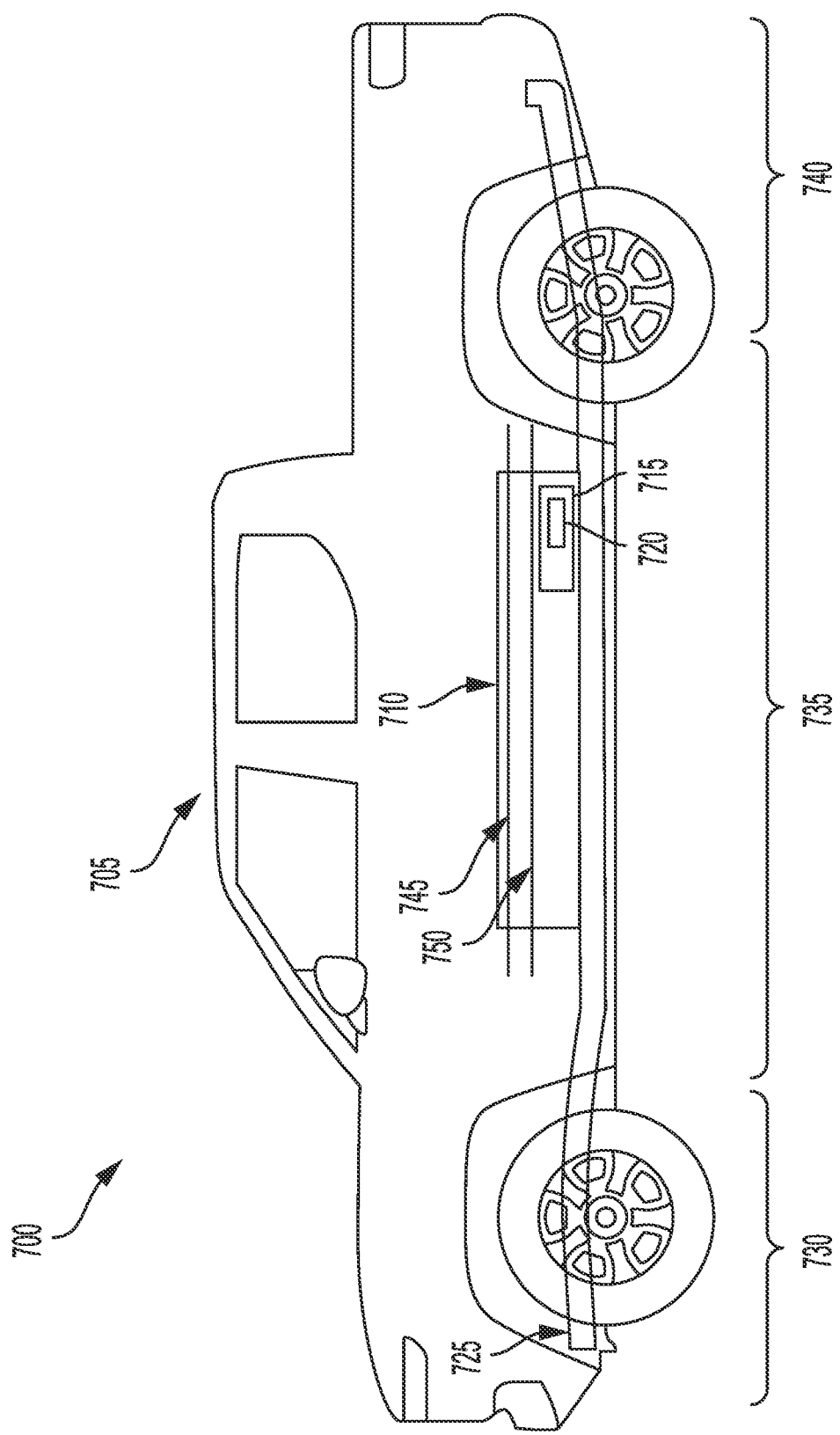
FIG. 7 depicts an example electric vehicle.

FIG. 7 depicts an example cross-sectional view 700 of an electric vehicle 705 installed with at least one battery pack 710. Electric vehicles 705 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 710 can also be used as an energy storage system to power a building, such as a residential home or commercial building. Electric vehicles 705 can be fully electric or partially electric (e.g., plug-in hybrid) and further, electric vehicles 705 can be fully autonomous, partially autonomous, or unmanned. Electric vehicles 705 can also be human operated or non-autonomous. Electric vehicles 705 such as electric trucks or automobiles can include on-board battery packs 710, batteries 715 or battery modules 715, or battery cells 720 to power the electric vehicles. The electric vehicle 705 can include a chassis 725 (e.g., a frame, internal frame, or support structure). The chassis 725 can support various components of the electric vehicle 705. The chassis 725 can span a front portion 730 (e.g., a hood or bonnet portion), a body portion 735, and a rear portion 740 (e.g., a trunk, payload, or boot portion) of the electric vehicle 705. The battery pack 710 can be installed or placed within the electric vehicle 705. For example, the battery pack 710 can be installed on the chassis 725 of the electric vehicle 705 within one or more of the front portions 730, the body portion 735, or the rear portion 740. The battery pack 710 can include or connect with at least one busbar, e.g., a current collector element. For example, the first busbar 745 and the second busbar 750 can include electrically conductive material to connect or otherwise electrically couple the battery 715, the battery modules 715, or the battery cells 720 with other electrical components of the electric vehicle 705 to provide electrical power to various systems or components of the electric vehicle 705.

Figure 8A:
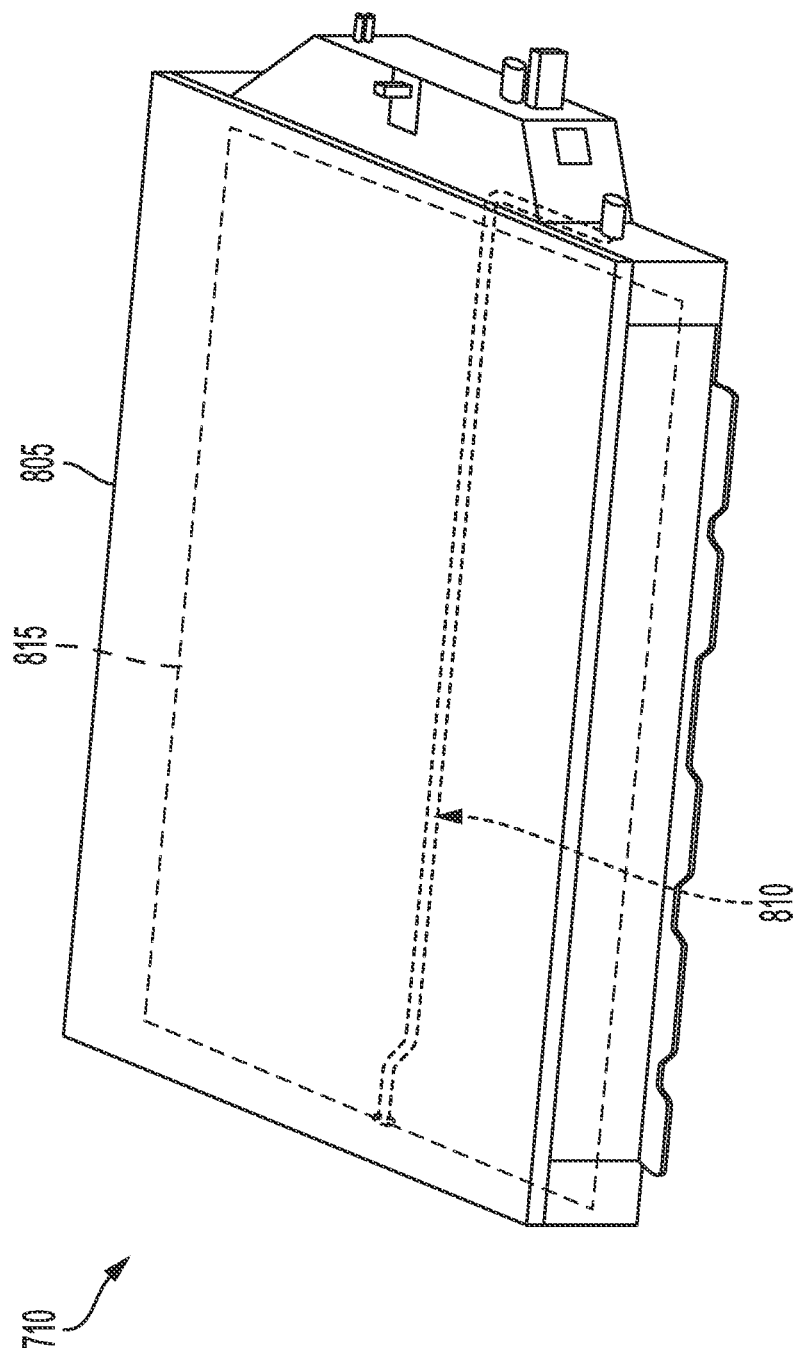
FIG. 8A depicts an example of one or more battery packs.

FIG. 8A depicts an example battery pack 710. Referring to FIG. 8A, among others, the battery pack 710 can provide power to electric vehicle 705. Battery packs 710 can include any arrangement or network of electrical, electronic, mechanical or electromechanical devices to power a vehicle of any type, such as the electric vehicle 705. The battery pack 710 can include at least one housing 805. The housing 805 can include at least one battery module 715 or at least one battery cell 720, as well as other battery pack components. The battery module 715 can be or can include one or more groups of prismatic cells, cylindrical cells, pouch cells, or other form factors of battery cells 720. The housing 805 can include a shield on the bottom or underneath the battery module 715 to protect the battery module 715 or cells 720 from external conditions, for example if the electric vehicle 705 is driven over rough terrains (e.g., off-road, trenches, rocks, etc.) The battery pack 710 can include at least one cooling line 810 that can distribute fluid through the battery pack 710 as part of a thermal or temperature control or heat exchange system that can also include at least one thermal component (e.g., cold plate) 815. The thermal component 815 can be positioned in relation to a top submodule and a bottom submodule, such as in between the top and bottom submodules, among other possibilities. The battery pack 710 can include any number of thermal components 815. For example, there can be one or more thermal components 815 per battery pack 710, or per battery module 715. At least one cooling line 810 can be coupled with, part of, or independent from the thermal component 815.

Figure 8B:
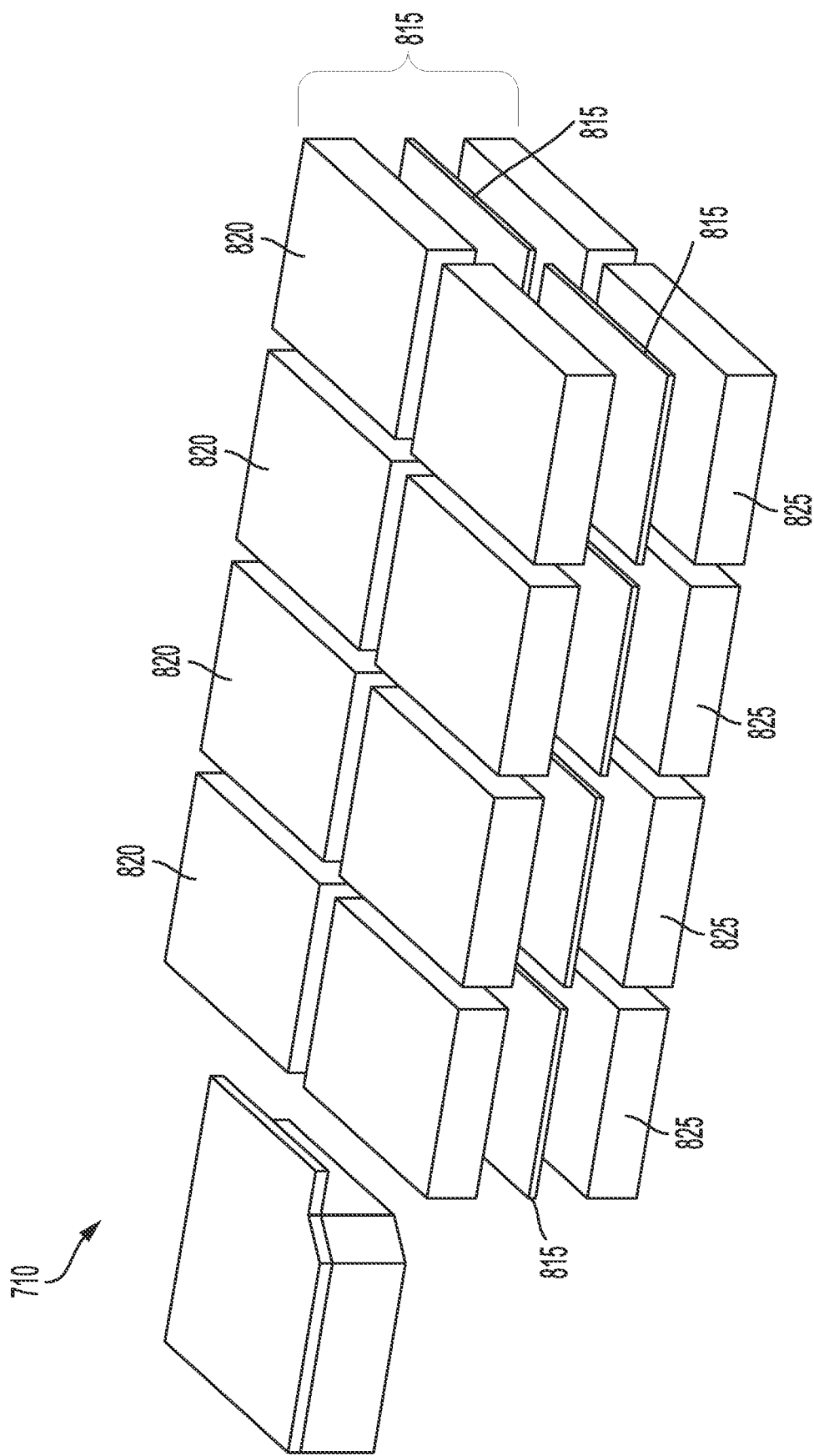
FIG. 8B depicts an example of one or more battery modules.
Figure 8D:
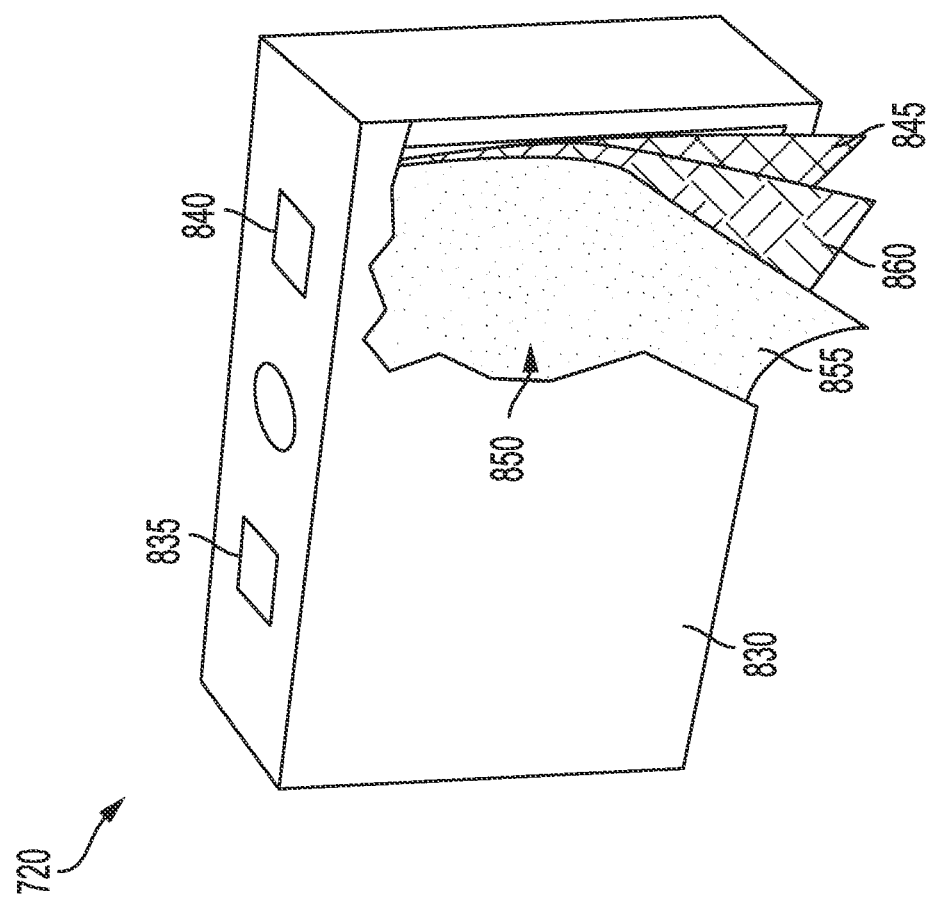
FIG. 8D depicts a cross sectional view of a battery cell.
Figure 8E:
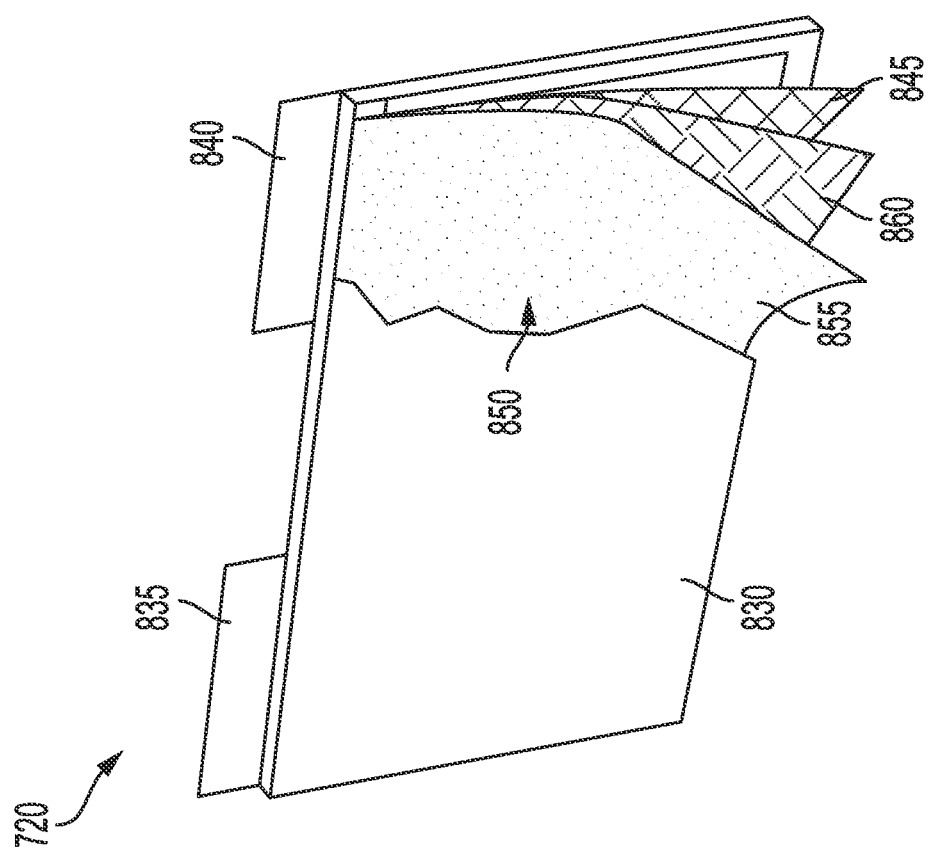
FIG. 8E depicts a cross sectional view of a battery cell.

FIG. 8B depicts example battery modules 715, and FIGS. 8C, 8D and 8E depict an example cross sectional view of a battery cell 720. The battery modules 715 can include at least one submodule. For example, the battery modules 715 can include at least one first (e.g., top) submodule 820 or at least one second (e.g., bottom) submodule 825. At least one thermal component 815 can be disposed between the top submodule 820 and the bottom submodule 825. For example, one thermal component 815 can be configured for heat exchange with one battery module 715. The thermal component 815 can be disposed or thermally coupled between the top submodule 820 and the bottom submodule 825. One thermal component 815 can also be thermally coupled with more than one battery module 715 (or more than two submodules 820, 825). The thermal components 815 shown adjacent to each other can be combined into a single thermal component 815 that spans the size of one or more submodules 820 or 825. The thermal component 815 can be positioned underneath submodule 820 and over submodule 825, in between submodules 820 and 825, on one or more sides of submodules 820, 825, among other possibilities. The thermal component 815 can be disposed in sidewalls, cross members, structural beams, among various other components of the battery pack, such as battery pack 710 described above. The battery submodules 820, 825 can collectively form one battery module 715. In some examples each submodule 820, 825 can be considered as a complete battery module 715, rather than a submodule.

The battery modules 715 can each include a plurality of battery cells 720. The battery modules 715 can be disposed within the housing 805 of the battery pack 710. The battery modules 715 can include battery cells 720 that are cylindrical cells or prismatic cells, for example. The battery module 715 can operate as a modular unit of battery cells 720. For example, a battery module 715 can collect current or electrical power from the battery cells 720 that are included in the battery module 715 and can provide the current or electrical power as output from the battery pack 710. The battery pack 710 can include any number of battery modules 715. For example, the battery pack can have one, two, three, four, five, six, seven, eight, nine, ten, eleven, twelve or other number of battery modules 715 disposed in the housing 805. It should also be noted that each battery module 715 can include a top submodule 820 and a bottom submodule 825, possibly with a thermal component 815 in between the top submodule 820 and the bottom submodule 825. The battery pack 710 can include or define a plurality of areas for positioning of the battery module 715 or cells 720. The battery modules 715 can be square, rectangular, circular, triangular, symmetrical, or asymmetrical. In some examples, battery modules 715 can be different shapes, such that some battery modules 715 are rectangular but other battery modules 715 are square shaped, among other possibilities. The battery module 715 can include or define a plurality of slots, holders, or containers for a plurality of battery cells 720. It should be noted the illustrations and descriptions herein are provided for example purposes and should not be interpreted as limiting. For example, the battery cells 720 can be inserted in the battery pack 710 without battery modules 820 and 825. The battery cells 720 can be disposed in the battery pack 710 in a cell-to-pack configuration without modules 820 and 825, among other possibilities.

Battery cells 720 have a variety of form factors, shapes, or sizes. For example, battery cells 720 can have a cylindrical, rectangular, square, cubic, flat, pouch, elongated or prismatic form factor. As depicted in FIG. 8C, for example, the battery cell 720 can be cylindrical. As depicted in FIG. 8D, for example, the battery cell 720 can be prismatic. As depicted in FIG. 8E, for example, the battery cell 720 can include a pouch form factor. Battery cells 720 can be assembled, for example, by inserting a winded or stacked electrode roll (e.g., a jelly roll) including electrolyte material into at least one battery cell housing 830. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 720 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 720. The housing 830 can be of various shapes, including cylindrical or rectangular, for example. Electrical connections can be made between the electrolyte material and components of the battery cell 720. For example, electrical connections to the electrodes with at least some of the electrolyte material can be formed at two points or areas of the battery cell 720, for example to form a first polarity terminal 835 (e.g., a positive or anode terminal) and a second polarity terminal 840 (e.g., a negative or cathode terminal). The polarity terminals can be made from electrically conductive materials to carry electrical current from the battery cell 720 to an electrical load, such as a component or system of the electric vehicle 705.

For example, the battery cell 720 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 720 to separate the anode and cathode from each other and to facilitate transfer of lithium ions between the anode and cathode. It should be noted that battery cell 720 can also take the form of a solid-state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid-state electrolyte), for example, polyacrylonitrile (PAN), polyethylene oxide (PEO), polymethyl-methacrylate (PMMA), and polyvinylidene fluoride (PVDF), among others.

The battery cell 720 can be included in battery modules 715 or battery packs 710 to power components of the electric vehicle 705. The battery cell housing 830 can be disposed in the battery module 715, the battery pack 710, or a battery array installed in the electric vehicle 705. The housing 830 can be of any shape, such as cylindrical with a circular (e.g., as depicted in FIG. 8C, among others), elliptical, or ovular base, among others. The shape of the housing 830 can also be prismatic with a polygonal base, as shown in FIG. 8D, among others. As shown in FIG. 8E, among others, the housing 830 can include a pouch form factor. The housing 830 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 830 of the battery cell 720 can include one or more materials with various electrical conductivity or thermal conductivity, or a combination thereof. The electrically conductive and thermally conductive material for the housing 830 of the battery cell 720 can include a metallic material, such as aluminum, an aluminum alloy with copper, silicon, tin, magnesium, manganese, or zinc (e.g., aluminum 6000, 4000, or 5000 series), iron, an iron-carbon alloy (e.g., steel), silver, nickel, copper, and a copper alloy, among others. The electrically insulative and thermally conductive material for the housing 830 of the battery cell 720 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 830 of the battery cell 720 is prismatic (e.g., as depicted in FIG. 8D, among others) or cylindrical (e.g., as depicted in FIG. 8C, among others), the housing 830 can include a rigid or semi-rigid material such that the housing 830 is rigid or semi-rigid (e.g., not easily deformed or manipulated into another shape or form factor). In examples where the housing 830 includes a pouch form factor (e.g., as depicted in FIG. 8E, among others), the housing 830 can include a flexible, malleable, or non-rigid material such that the housing 830 can be bent, deformed, manipulated into another form factor or shape.

The battery cell 720 can include at least one anode layer 845, which can be disposed within the cavity 850 defined by the housing 830. The anode layer 845 can include a first redox potential. The anode layer 845 can receive electrical current into the battery cell 720 and output electrons during the operation of the battery cell 720 (e.g., charging or discharging of the battery cell 720). The anode layer 845 can include an active substance. The active substance can include, for example, an activated carbon or a material infused with conductive materials (e.g., artificial or natural graphite, or blended), lithium titanate (Li4Ti5O12), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not include an anode active material in an uncharged state.

The battery cell 720 can include at least one cathode layer 855 (e.g., a composite cathode layer compound cathode layer, a compound cathode, a composite cathode, or a cathode). The cathode layer 855 can include a second redox potential that can be different than the first redox potential of the anode layer 845. The cathode layer 855 can be disposed within the cavity 850. The cathode layer 855 can output electrical current out from the battery cell 720 and can receive electrons during the discharging of the battery cell 720. The cathode layer 855 can also receive lithium ions during the discharging of the battery cell 720. Conversely, the cathode layer 855 can receive electrical current into the battery cell 720 and can output electrons during the charging of the battery cell 720. The cathode layer 855 can release lithium ions during the charging of the battery cell 720.

The battery cell 720 can include a layer 860 disposed within the cavity 850. The layer 860 can include a solid electrolyte layer. The layer 860 can include a separator wetted by a liquid electrolyte. The layer 860 can include a polymeric material. The layer 860 can include a polymer separator. The layer 860 can be arranged between the anode layer 845 and the cathode layer 855 to separate the anode layer 845 and the cathode layer 855. The polymer separator can physically separate the anode and cathode from a cell short circuit. A separator can be wetted with a liquid electrolyte. The liquid electrolyte can be diffused into the anode layer 845. The liquid electrolyte can be diffused into the cathode layer 855. The layer 860 can help transfer ions (e.g., Li+ ions) between the anode layer 845 and the cathode layer 855. The layer 860 can transfer Li+ cations from the anode layer 845 to the cathode layer 855 during the discharge operation of the battery cell 720. The layer 860 can transfer lithium ions from the cathode layer 855 to the anode layer 845 during the charge operation of the battery cell 720.

The redox potential of layers (e.g., the first redox potential of the anode layer 845 or the second redox potential of the cathode layer 855) can vary based on a chemistry of the respective layer or a chemistry of the battery cell 720. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 855). Lithium-ion batteries can include a graphite chemistry, a silicon-graphite chemistry, or a lithium metal chemistry for the anode layer (e.g., the anode layer 845).

For example, lithium-ion batteries can include an olivine phosphate (LiMPO4, M=Fe and/or Co and/or Mn and/or Ni)) chemistry, LISICON or NASICON Phosphates (Li3M2 (PO4)3 and LiMPO4x, M=Ti, V, Mn, Cr, and Zr), for example lithium iron phosphate (LFP), lithium iron manganese phosphate (LMFP), layered oxides (LiMO2, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides (Li1+xM1–xO2) (Ni, and/or Mn, and/or Co), (OLO or LMR), spinel (LiMn2O4) and high voltage spinels (LiMn1.5Ni0.5O4), disordered rock salt, Fluorophosphates Li2FePO4F (M=Fe, Co, Ni) and Fluorosulfates LiMSO4F (M=Co, Ni, Mn) (e.g., the cathode layer 855). Lithium-ion batteries can include a graphite chemistry, a silicon-graphite chemistry, or a lithium metal chemistry for the anode layer (e.g., the anode layer 845). For example, a cathode layer having an LFP chemistry can have a redox potential of 3.4 V vs. Li/Li+, while an anode layer having a graphite chemistry can have a 0.2 V vs. Li/Li+ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 855) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 845) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, cascine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD207A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The layer 860 can include or be made of a liquid electrolyte material. For example, the layer 860 can be or include at least one layer of polymeric material (e.g., polypropylene, polyethylene, or other material) including pores that are wetted (e.g., saturated with, soaked with, receive, are filled with) a liquid electrolyte substance to enable ions to move between electrodes. The liquid electrolyte material can include a lithium salt dissolved in a solvent. The lithium salt for the liquid electrolyte material for the layer 860 can include, for example, lithium tetrafluoroborate (LiBF4), lithium hexafluorophosphate (LiPF6), and lithium perchlorate (LiClO4), among others. The solvent can include, for example, dimethyl carbonate (DMC), ethylene carbonate (EC), and diethyl carbonate (DEC), among others. Liquid electrolyte is not necessarily disposed near the layer 860, but the liquid electrolyte can fill the battery cells 720 in many different ways. The layer 860 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula ABO3 (A=Li, Ca, Sr, La, and B=Al, Ti), garnet-type with formula A3B2(XO4)3 (A=Ca, Sr, Ba and X=Nb, Ta), lithium phosphorous oxy-nitride (LixPOyNz). In some embodiments, the solid electrolyte layer can include a glassy, ceramic and/or crystalline sulfide-based electrolyte (e.g., Li3PS4, Li7P3S11, Li2S—P2S5, Li2S—B2S3, SnS—P2S5, Li2S—SiS2, Li2S—P2S5, Li2S—GeS2, Li10GeP2S12) and/or sulfide-based lithium argyrodites with formula Li6PS5X (X=Cl, Br) like Li6PS5Cl). Furthermore, the solid electrolyte layer can include a polymer electrolyte material (e.g., a hybrid or pseudo-solid-state electrolyte), for example, polyacrylonitrile (PAN), polyethylene oxide (PEO), polymethyl-methacrylate (PMMA), and polyvinylidene fluoride (PVDF), among others.

In examples where the layer 860 includes a liquid electrolyte material, the layer 860 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 860 can include at least one additive. The additives can be or include vinylidene carbonate, fluoroethylene carbonate, ethyl propionate, methyl propionate, methyl acetate, ethyl acetate, or a mixture of any two or more thereof. The layer 860 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the layer 860 from greater than 0 M to about 1.5 M. Once disposed to the battery cell 720, liquid electrolyte can be present and touching battery subcomponents present within the battery cell 720. The battery subcomponents can include the cathode, the anode, the separator, the current collector, etc.

Figure 9:
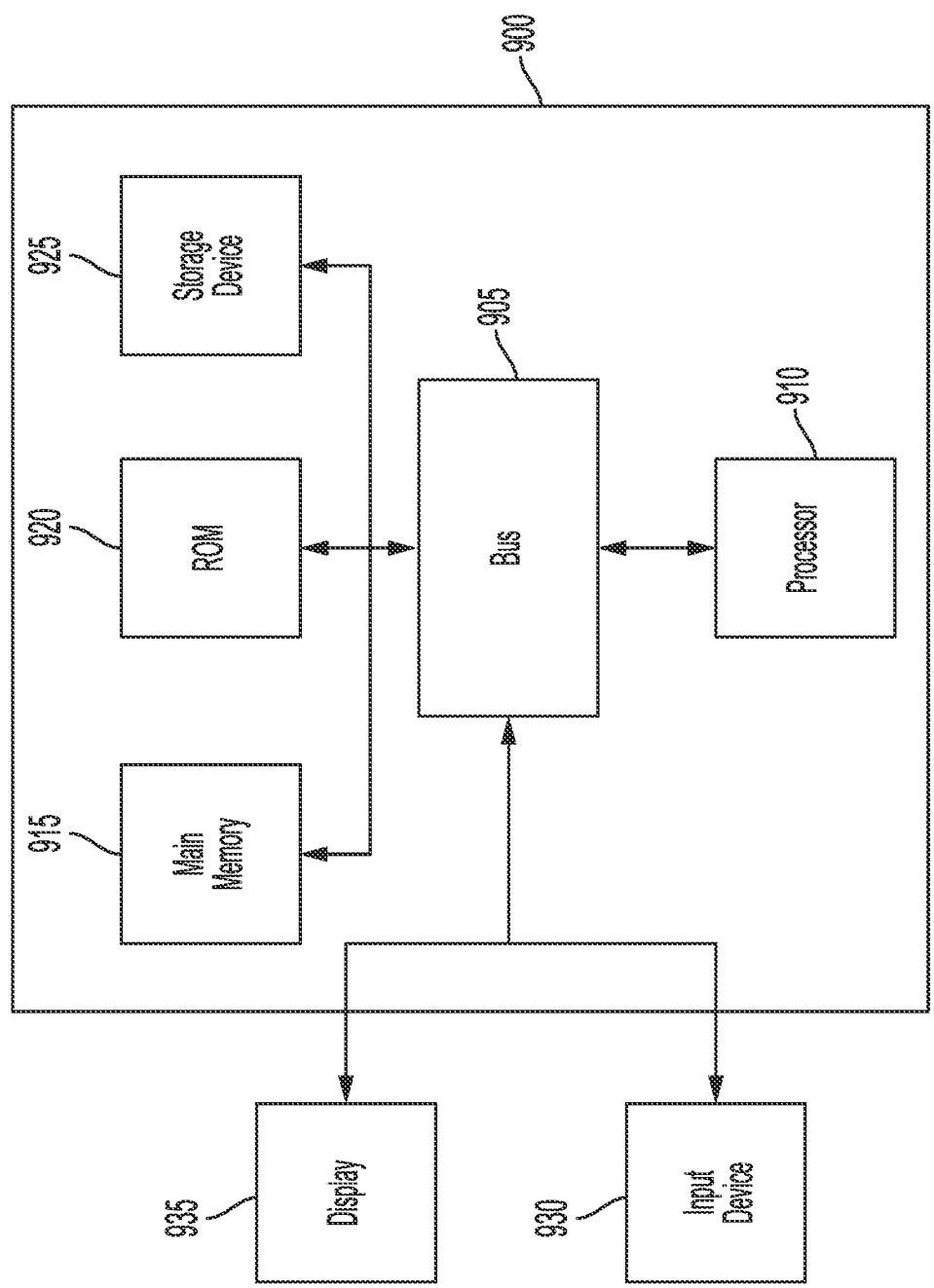
FIG. 9 is a block diagram illustrating an architecture for a computer system that can be employed to implement elements of the systems and methods described and illustrated herein.

FIG. 9 depicts an example block diagram of an example computer system 900. The computer system or computing device 900 can include or be used to implement a data processing system or its components. The computing system 900 includes at least one bus 905 or other communication component for communicating information and at least one processor 910 or processing circuit coupled to the bus 905 for processing information. The computing system 900 can also include one or more processors 910 or processing circuits coupled to the bus for processing information. The computing system 900 also includes at least one main memory 915, such as a random-access memory (RAM) or other dynamic storage device, coupled to the bus 905 for storing information, and instructions to be executed by the processor 910. The main memory 915 can be used for storing information during execution of instructions by the processor 910. The computing system 900 may further include at least one read only memory (ROM) 920 or other static storage device coupled to the bus 905 for storing static information and instructions for the processor 910. A storage device 925, such as a solid-state device, magnetic disk or optical disk, can be coupled to the bus 905 to persistently store information and instructions.

The computing system 900 may be coupled via the bus 905 to a display 935, such as a liquid crystal display, or active-matrix display, for displaying information to a user such as a driver of the electric vehicle 705 or other end user.

An input device 930, such as a keyboard or voice interface may be coupled to the bus 905 for communicating information and commands to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 9, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer-based components.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery system, comprising:
a plurality of cells arranged in an array;
a first support structure comprising a first material to hold, in a first parallel configuration, a first portion of a first group of cells of the plurality of cells, the first support structure further comprising a first spacing within the first portion of the first group of cells, wherein the first parallel configuration distributes current load across the first group of cells;
a second support structure, adjacent to the first support structure, comprising a second material to hold, in a second parallel configuration, a second portion of the first group of cells and a first portion of a second group of cells of the plurality of cells, the second support structure further comprising a second spacing between the second portion of the first group of cells and the first portion of the second group of cells, wherein the second spacing is greater than the first spacing, and wherein the second parallel configuration distributes current load across the second group of cells; and
a third support structure, adjacent to the second support structure and opposite to the first support structure, comprising the first material to hold a second portion of the second group of cells of the plurality of cells, the third support structure further comprising the first spacing within the second portion of the second group of cells.

2. The battery system of claim 1, wherein at least one of the first material or the second material comprises foam.

3. The battery system of claim 1, wherein at least one of the first material or the second material comprises expanded polypropylene or modified polyphenylene ether, or a combination thereof.

4. The battery system of claim 1, wherein at least one of the first material or the second material facilitates thermal management for the plurality of cells.

5. The battery system of claim 1, wherein the first support structure comprises a thermal component within the material to carry a fluid to dissipate heat generated from the first portion of the first group of cells.

6. The battery system of claim 1, comprising:
a first block formed from the first support structure and the first portion of the first group of cells; and
a second block formed from the second support structure and the second portion of the first group of cells, the second block assembled with the first block to establish the array of the plurality of cells.

7. The battery system of claim 1, wherein the first support structure comprises a thickness of at least 2 millimeters.

8. The battery system of claim 1, wherein the second material of the second support structure is in contact with one or more cells of the first group of cells and one or more cells of the second group of cells.

9. The battery system of claim 1, wherein the first support structure, second support structure, and third support structure are configured such that each structure fills in the gaps of the adjacent structure.

10. The battery system of claim 1, wherein the first support structure, second support structure, and third support structure are configured to be in contact with at least 10% of the outer surface of each cell.

11. The battery system of claim 1, wherein the battery system further comprises:
a current collector assembly placed on a top surface of the plurality of cells comprising a conductor layer configured to provide an electrically conductive path for electricity to and from the plurality of cells.

12. The battery system of claim 11, wherein the battery system further comprises:
a series busbar configured to maintain electrical current distribution and provide a low-impedance path for the current to flow to ground, protecting the components of the current collector assembly.

13. The battery system of claim 12, wherein the battery system further comprises:
a balancing voltage and temperature module at one end, wherein the BVT module is configured to:
measure at least one a temperature or a state of charge of at least one of the first group or second group of cells of the plurality of cells,
sense and control voltage flows through the at least one of the first group or second group of cells of the plurality of cells, and
providing real-time feedback of temperature and voltage flows of the at least one of the first group or second group of cells of the plurality of cells.

14. A method, comprising:
providing a battery system comprising a plurality of cells arranged in an array, wherein the battery system comprises:
a first support structure comprising a first material to hold, in a first parallel configuration, a first portion of a first group of cells of the plurality of cells, the first support structure further comprising a first spacing within the first portion of the first group of cells, wherein the first parallel configuration distributes current load across the first group of cells;
a second support structure, adjacent to the first support structure, comprising a second material to hold, in a second parallel configuration, a second portion of the first group of cells and a first portion of a second group of cells of the plurality of cells, the second support structure further comprising a second spacing between the second portion of the first group of cells and the first portion of the second group of cells, wherein the second spacing is greater than the first spacing, and wherein the second parallel configuration distributes current load across the second group of cells; and
a third support structure, adjacent to the second support structure and opposite to the first support structure, comprising the first material to hold a second portion of the second group of cells of the plurality of cells, the third support structure further comprising the first spacing within the second portion of the second group of cells.

15. The method of claim 14, wherein at least one of the first material or the second material comprises foam.

16. The method of claim 15, wherein the foam is configured into shapes that conform to the contours of the cells.

17. The method of claim 14, wherein at least one of the first material or the second material comprises expanded polypropylene or modified polyphenylene ether, or a combination thereof.

18. The method of 14, wherein the first support structure comprises a thermal component within the material to carry a fluid to dissipate heat generated from the first portion of the first group of cells.

19. The method of claim 14, comprising:
assembling a first block formed from the first support structure and the first portion of the first group of cells with a second block formed from the second support structure and the second portion of the first group of cells.

20. An electric vehicle, comprising:
a plurality of cells arranged in an array;
a first support structure comprising a first material to hold, in a first parallel configuration, a first portion of a first group of cells of the plurality of cells with a first spacing within the first portion of the first group of cells, wherein the first parallel configuration distributes current load across the first group of cells;
a second support structure, adjacent to the first support structure, comprising a second material to hold, in a second parallel configuration, a second portion of the first group of cells and a first portion of a second group of cells of the plurality of cells with a second spacing between the second portion of the first group of cells and the first portion of the second group of cells, wherein the second spacing is greater than the first spacing, and wherein the second parallel configuration distributes current load across the second group of cells; and
a third support structure, adjacent to the second support structure and opposite to the first support structure, comprising the first material to hold a second portion of the second group of cells of the plurality of cells with the first spacing within the second portion of the second group of cells.

21. The electric vehicle of claim 20, wherein at least one of the first material or the second material comprises foam.

* * * * *